(No Model.)

J. N. & I. N. BURKE.
ELASTIC TRACE CONNECTION.

No. 472,783. Patented Apr. 12, 1892.

Witnesses,

Inventors,
Jabez N. Burke
Ira N. Burke
By Dewey & Co.
Attys

UNITED STATES PATENT OFFICE.

JABEZ NEWTON BURKE AND IRA N. BURKE, OF FOREST HILL, CALIFORNIA.

ELASTIC TRACE CONNECTION.

SPECIFICATION forming part of Letters Patent No. 472,783, dated April 12, 1892.

Application filed December 1, 1891. Serial No. 413,703. (No model.)

*To all whom it may concern:*

Be it known that we, JABEZ NEWTON BURKE and IRA N. BURKE, citizens of the United States, residing at Forest Hill, Placer county, State of California, have invented an Improvement in Elastic Trace Connections; and we hereby declare the following to be a full, clear, and exact description of the same.

Our invention relates to that class of connections or couplings between traces and whiffletrees in which springs or other elastic devices are employed to make the pull a yielding one.

Our invention consists in the novel connection hereinafter fully described, and specifically pointed out in the claims.

The object of our invention is to provide a simple, powerful, and durable trace connection of this class.

Figure 1:
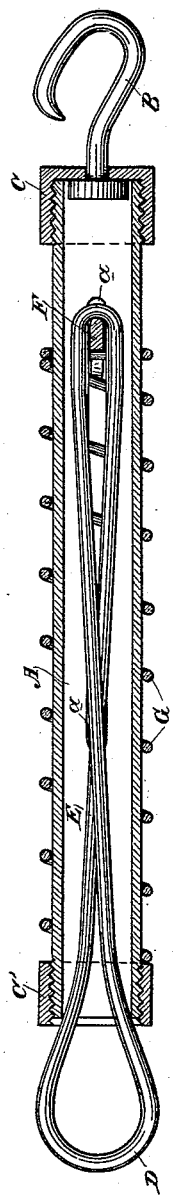
Figure 2:
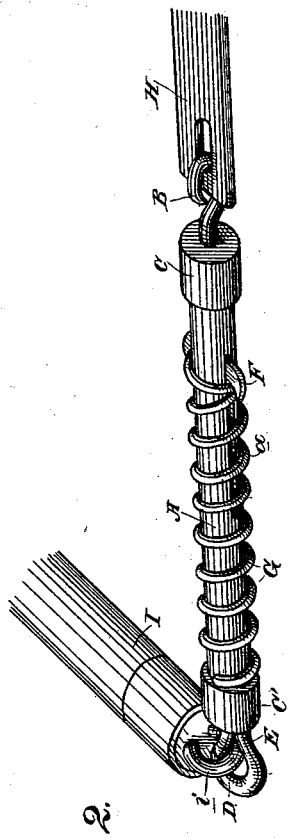

Referring to the accompanying drawings for a more complete explanation of our invention, Figure 1 is a longitudinal section of our connection. Fig. 2 is an elevation of same.

A is a tubular or hollow bar having connected with its forward end the swivel-hook B. This connection may be made in any suitable manner. (Here shown by confining the head of the hook in the end of the tubular bar by means of a removable screw-cap C.) In the sides of the tubular bar, near its forward end, are made the elongated slots $a$.

D is a snap-hook of suitable construction. It is formed with or is connected to a shank E, which is seated within the tubular bar and carries on its forward end a cross-head F, which projects through the slots $a$ of the bar. We have here shown the snap-hook and shank as composed of a single piece bent double. The hook is formed by the ends of the piece which project from the rear end of the tubular bar, and the cross-head F is embraced by the bight of the piece. Around the tubular bar A is seated the spiral spring G. The ends of this spring are confined between the cross-head F and a cap C' on the rear end of the tubular bar.

In use the hook B is caused to engage the eye or loop of the trace H, and the snap-hook D engages the clip $i$ on the end of whiffletree I. The pull or strain on the trace is received by the spring G, instead of by the whiffletree directly, as in the usual forms of connections.

Our connection is a simple one, easy to construct, strong and durable, and is capable of ready application to any trace and whiffletree.

In practice the strength of the spring G is regulated by the load to be drawn. The horse can start the load easier and can continue the pull with less effort than with the common connection. Our device, by yielding on each side of the horse as he steps along, will relieve jerks and jars and prevent sore shoulders and will encourage the horse to greater efforts.

Having thus described our invention, what we claim as new, and desire to secure by Letters Patent, is—

1. An elastic trace connection consisting of a hollow bar having slotted sides and an end hook for the trace, a cross-head within said bar having ends projecting through the slots in its sides, a spring against which the cross-head bears, and a snap-hook fitted within the bar and formed with a doubled or bent shank having its bight encircling the cross-head and having its free ends confined by the end of the hollow bar, substantially as herein described.

2. An elastic trace connection consisting of the hollow or tubular bar having the end caps and the elongated side slots, the swivel-hook for the trace at the forward end of the bar and confined by the front cap, the snap-hook for the whiffletree projecting from the rear end of the bar and formed with a doubled or bent shank extending forwardly in said bar, the cross-head confined in the bight of said shank and projecting sidewise through the slots of the bar, and the spring seated upon the bar and having its ends confined by the rear cap of the bar and the cross-head of the shank, substantially as herein described.

In witness whereof we have hereunto set our hands.

JABEZ NEWTON BURKE.
IRA N. BURKE.

Witnesses:
C. G. MYERS,
MARIA MYERS.